United States Patent
Schordine

(10) Patent No.: US 8,118,287 B2
(45) Date of Patent: Feb. 21, 2012

(54) SHOCK-MITIGATING APPARATUS FOR SEATS AND OTHER OBJECTS

(75) Inventor: Adam Schordine, Cutchogue, NY (US)

(73) Assignee: STiDD Systems, Inc., Greenport, NY (US)

( * ) Notice: Subject to any disclaimer, the term of this patent is extended or adjusted under 35 U.S.C. 154(b) by 807 days.

(21) Appl. No.: 12/122,941

(22) Filed: May 19, 2008

(65) Prior Publication Data

US 2009/0283944 A1    Nov. 19, 2009

(51) Int. Cl.
*F16F 1/00*     (2006.01)
*F16M 13/00*    (2006.01)

(52) U.S. Cl. ......... 267/131; 248/264; 248/241; 248/588

(58) Field of Classification Search .................. 267/131, 267/136; 248/588, 564, 421; 297/344.16, 297/338
See application file for complete search history.

(56) References Cited

U.S. PATENT DOCUMENTS 3,752,432 A * 8/1973 Lowe ............................ 248/564
5,957,426 A * 9/1999 Brodersen .................... 248/588

* cited by examiner

*Primary Examiner* — Robert Siconolfi
*Assistant Examiner* — Anna Momper
(74) *Attorney, Agent, or Firm* — Ladas & Parry LLP

(57) ABSTRACT

A shock-mitigating damper apparatus for vertical shocks has a scissor linkage extending vertically between a base and an object. A damper is also connected between the base, the object, and is mounted to the base for substantially horizontal reciprocating damper motion. An articulated arm assembly connects one end of the damper to the object at a point substantially in vertical alignment with an intermediate pivot point for the scissors.

8 Claims, 6 Drawing Sheets

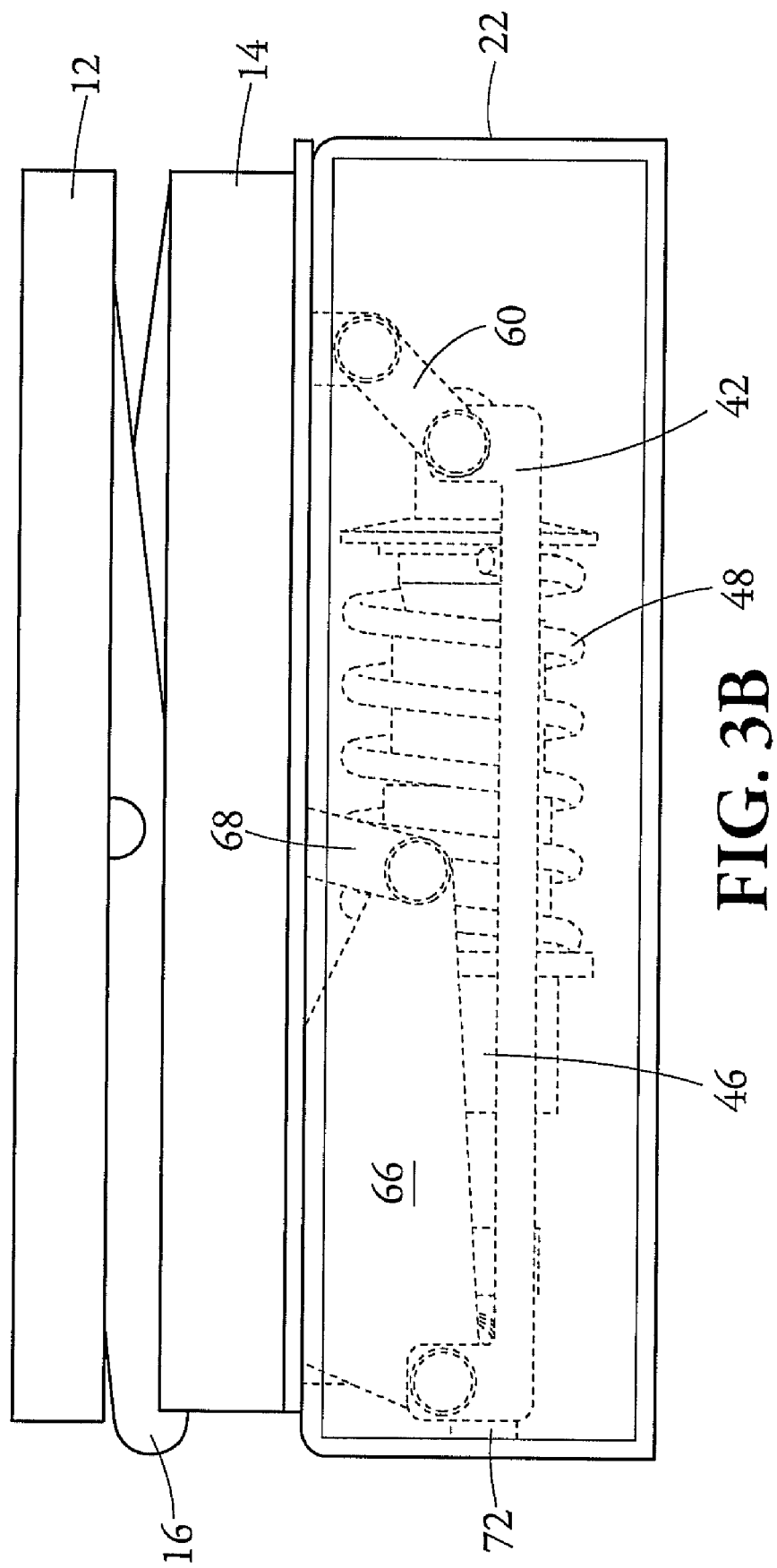

SHOCK-MITIGATING APPARATUS FOR SEATS AND OTHER OBJECTS

The present invention relates to an apparatus for preventing vibrational shocks from being passed from a base to an object resiliently mounted to the base. It has particular applicability, for example, as a mount for seats in vehicles, such as earth-moving vehicles, which travel over rough and uneven terrain.

BACKGROUND OF THE INVENTION

It is well recognized that shock-absorbing systems may be interposed between a base structure, such as a vehicle or ship body or superstructure, and a structure or equipment mounted to the base to provide isolation of the so-mounted equipment. In vehicles and ships, for example, such isolating mechanisms are used to support seats and seating systems, such that the driver or pilot of the vehicle or craft, as well as passengers, can be in some manner isolated from the buffeting resulting from travel over rough terrain or seas.

Human factors engineering recognizes both a dynamic response index ("DRI"), a measure of a peak acceleration realized by a human when subjected to a known forcing function, as well as a summation of equivalent static compressive stress realized by a human model, denoted as $S_e$. The significance of the $S_e$ variable is that it is a cumulative measure of stress over a normalized period of time.

Accordingly a purpose of the present invention to provide a shock-absorbing system, particularly adapted to provide appropriate isolation to a human, which represents an attempt to minimize both DRI and $S_e$.

BRIEF DESCRIPTION OF THE INVENTION

In accordance with the foregoing, a shock-mitigating apparatus of the present invention comprises a scissors support for a load, such as a vehicle seat and occupant, with respect to a base structure to which the apparatus is mounted. Shock-absorption is provided by the parallel arrangement of a damper and spring, the damper being connected to an accumulator having an adjustability feature to allow the damper to be preloaded as appropriate for the static load of the seat and occupant.

The parallel combination of spring and cylinder are arranged horizontally between the attachment points of the scissor support and to the base. One end of the spring/damper assembly is mounted to the base, while the other end is connected to the load through a rocker arm assembly that similarly lies within the footprint of the base. The resulting construction is of a compact size and therefore may be easily retrofitted into existing equipment, which may include other shock-mitigating devices, without the need for repositioning or reorienting the load.

BRIEF DESCRIPTION OF THE DRAWINGS

A fuller understanding of the present invention will be acquired upon consideration of the following detailed explanation of a preferred but nonetheless illustrative embodiment of the invention when reviewed in conjunction with the annexed drawings, wherein:

FIG. 3B is a view similar to that of FIG. 3A showing the orientation of the assembly when in a compressed orientation resulting from the absorption of a shock by the shock;

DETAILED DESCRIPTION OF THE INVENTION

Figure 1:
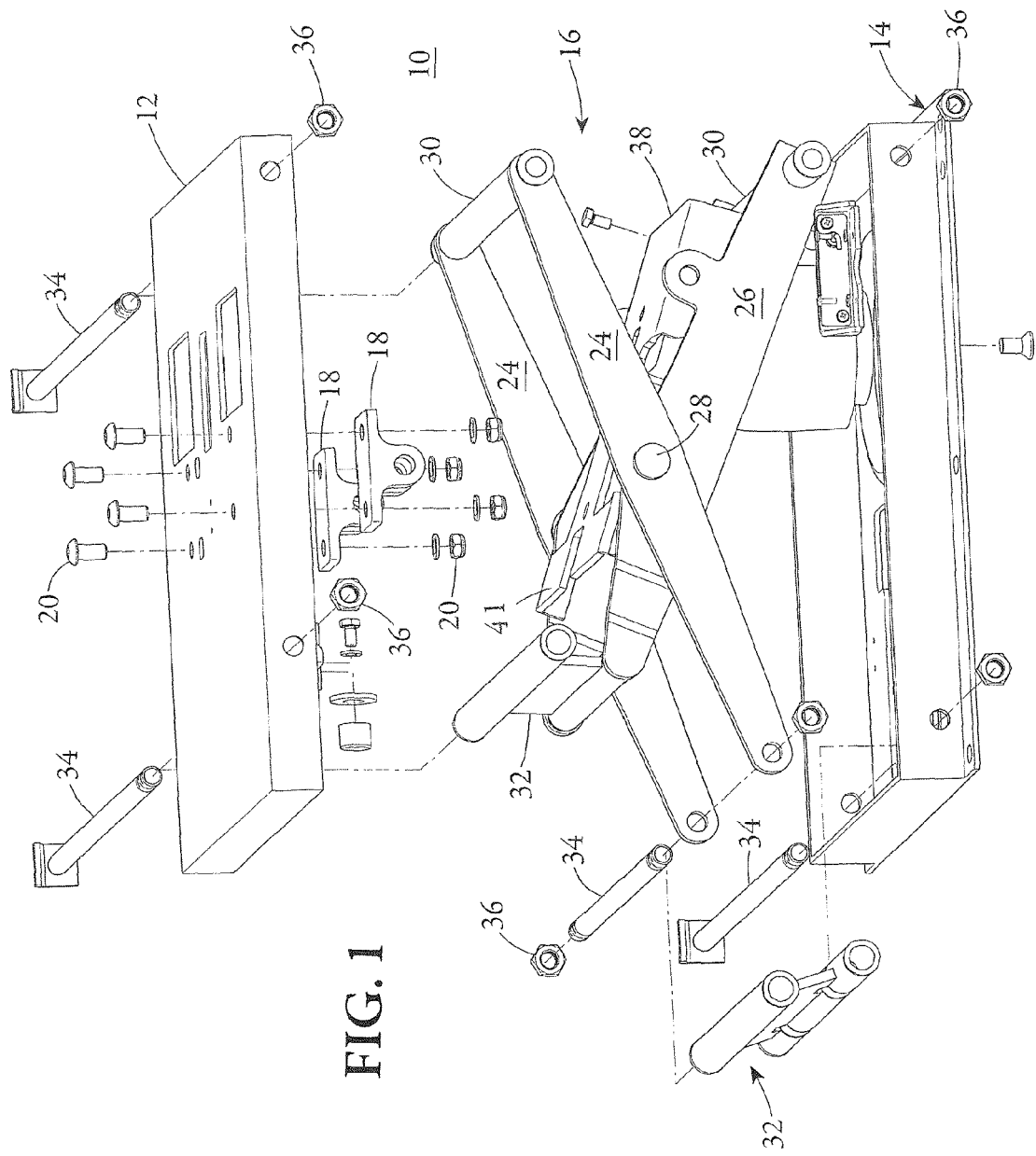
FIG. 1 is an exploded perspective view of the scissors support portion of a shock-mitigating apparatus of the present invention.
Figure 2:
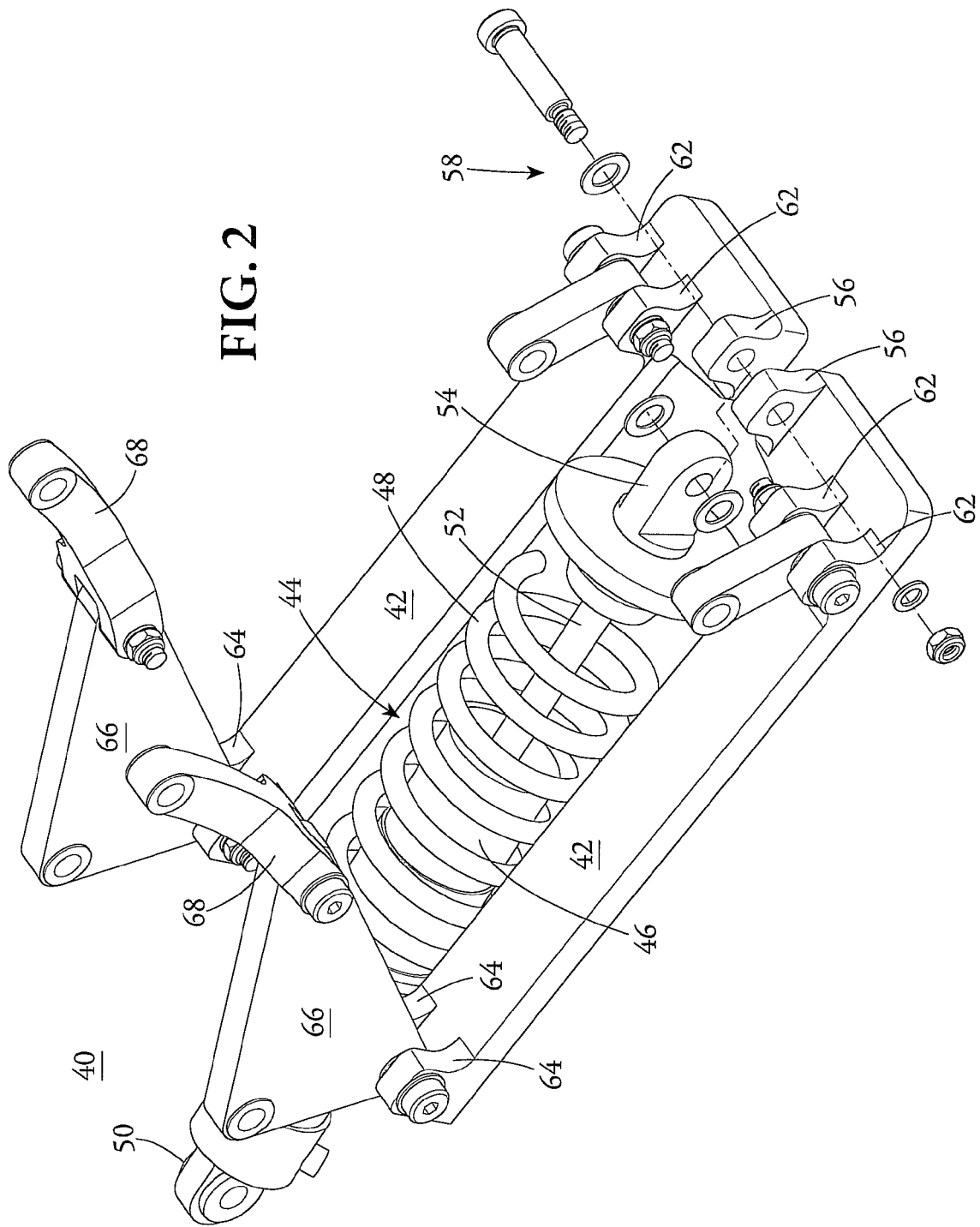
FIG. 2 is a perspective view of the spring/damper and associated support and rocker arm assembly of the invention.
Figure 3A:
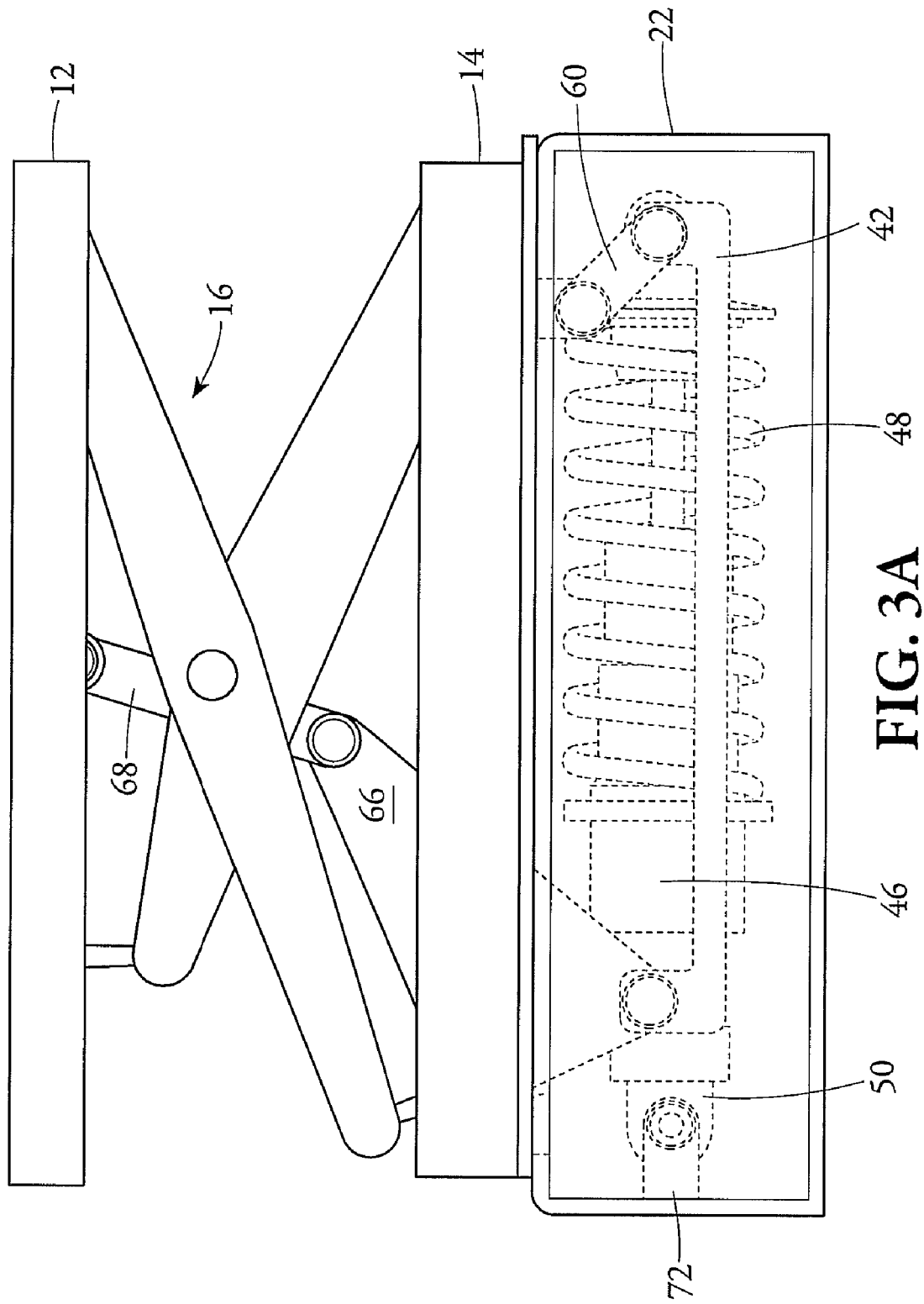
FIG. 3A is a simplified side elevation view of the invention depicting the orientation of the spring/damper assembly in an equilibrium position.

With initial reference to FIGS. 1 and 3A, shock-mitigating apparatus 10 comprises a top pan 12, to which an object, such as a vehicle seat, is mounted for shock absorption protection. The top pan 12 is supported for vertical travel with respect to bottom pan 14, mounted to the deck or chassis of the vehicle receiving the shocks to be mitigated. The top and bottom pans are joined together through scissor linkage assembly 16. A pair of pillow blocks 18 positioned between the arms of the scissors linkage assembly and mounted to the underside of the top pan by mounting bolt assemblies 20 provides a connection point for a spring/damper assembly as depicted in FIG. 2. The spring/damper assembly is mounted within a base housing 22, on which the bottom pan 14 sits, which in turn is mounted to the substrate, such as a vehicle chassis or vessel superstructure, through which shocks would be transmitted to the supported object.

The scissor linkage assembly 16, which may be part of the original support structure in which the present invention may be retrofitted, includes a first pair of parallel arms 24 pivotally joined to a second pair of parallel arms 26 at pivot axis 28. The two first arms 24 and second arms 26 are maintained in a spaced relationship from each other by cylindrical spacers 30 at a first end of the arm pairs and by scissor links 32 at their second ends. The arm ends are pivotally joined to the spacers and links, and to the top and bottom pans 12, 14, by mounting bolts 34 and corresponding nuts 36. A conventional air spring 38 may be mounted to the bottom pan 14 with a spring arm 41 that contacts the bottom of top pan 12 to provide a degree of initial buffering of downward displacements of the top pan with respect to the bottom pan as shocks are experienced. The air spring may be part of the original support structure.

Spring/damper assembly 40, detailed in FIG. 2, also interconnects the top pan 12 to the base or chassis to which it is mounted. As shown in FIG. 2, the assembly includes a pair of parallel shock links 42 that extend along opposed sides of spring/damper unit 44 which typically comprises a hydraulic damper cylinder 46 and a co-axial spring 48. The unit 44 may be, for example, a unit of a size capacity appropriate to the load supported and the shock magnitudes intended to be experienced, as determined by those knowledgeable in the art, manufactured by Taylor Devices Inc. with a 2-inch stroke. The cylinder 46 is provided with a first mounting collar 50 at its distal end, while the cylinder's piston arm 52 is provided with a second mounting collar 54 at the proximal end. The spring/damper unit is connected to the shock links 42 by pivotally connecting the second mounting collar 54 to a pair of spaced, bored lugs 56 located on the shock links 42 by mounting bolt assembly 58.

Shock links 42 also support a pair of guide links 60 pivotally mounted between pairs of mounting blocks 62 on the shock links. At the opposite ends of the shock links, pairs of similar mounting blocks 64 are provided for pivotable mounting of a pair of bell crank arms 66. The bell crank arms in turn support a pair of fork links 68 likewise mounted to the bell crank arms for pivotable rotation with respect thereto. Each of the mounts for the pivotable elements may be provided with bearing elements as known in the art to provide low friction connections.

Figure 4:
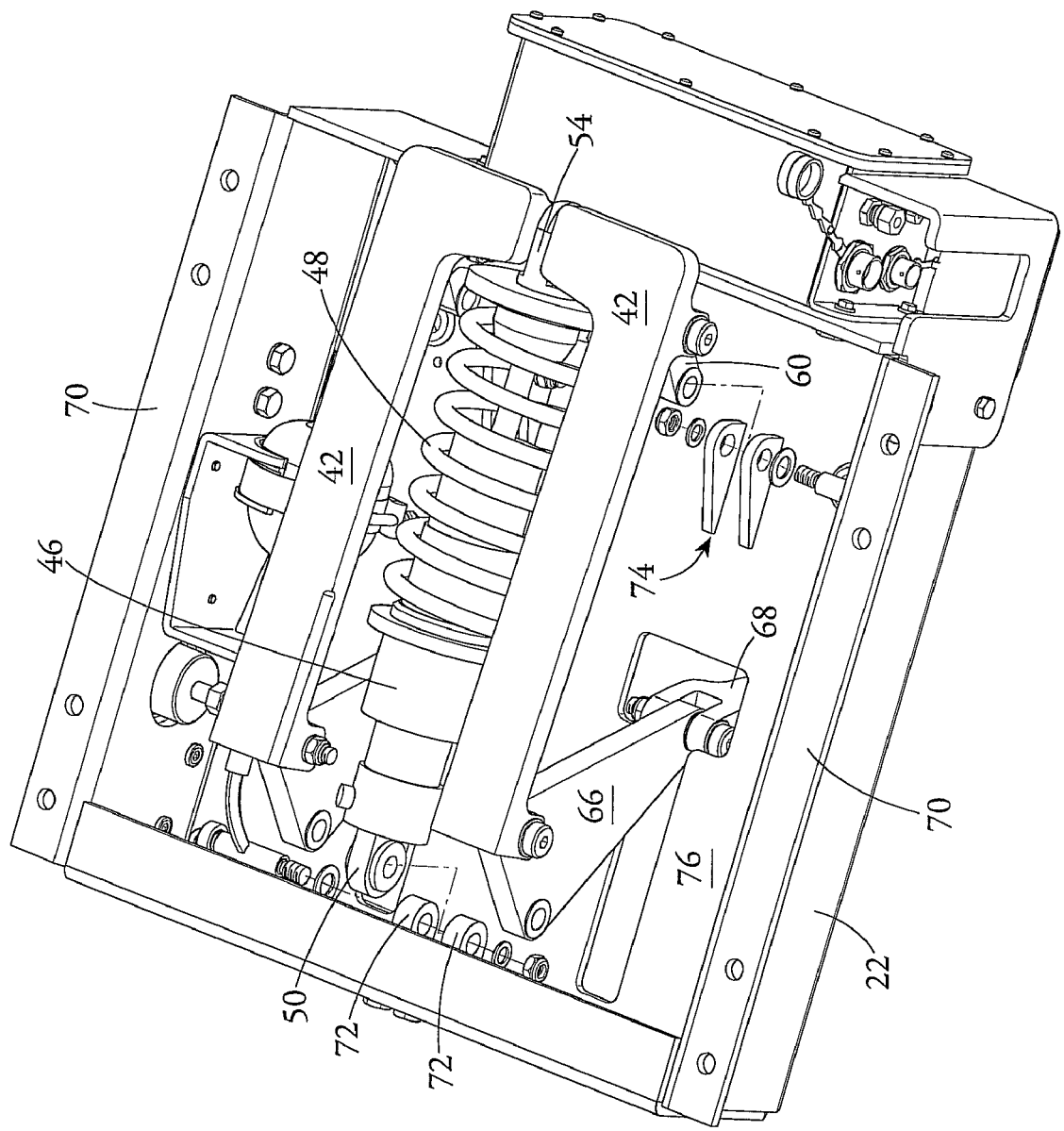
FIG. 4 is a bottom perspective view of the spring/damper and rocker arm assembly.
Figure 5:
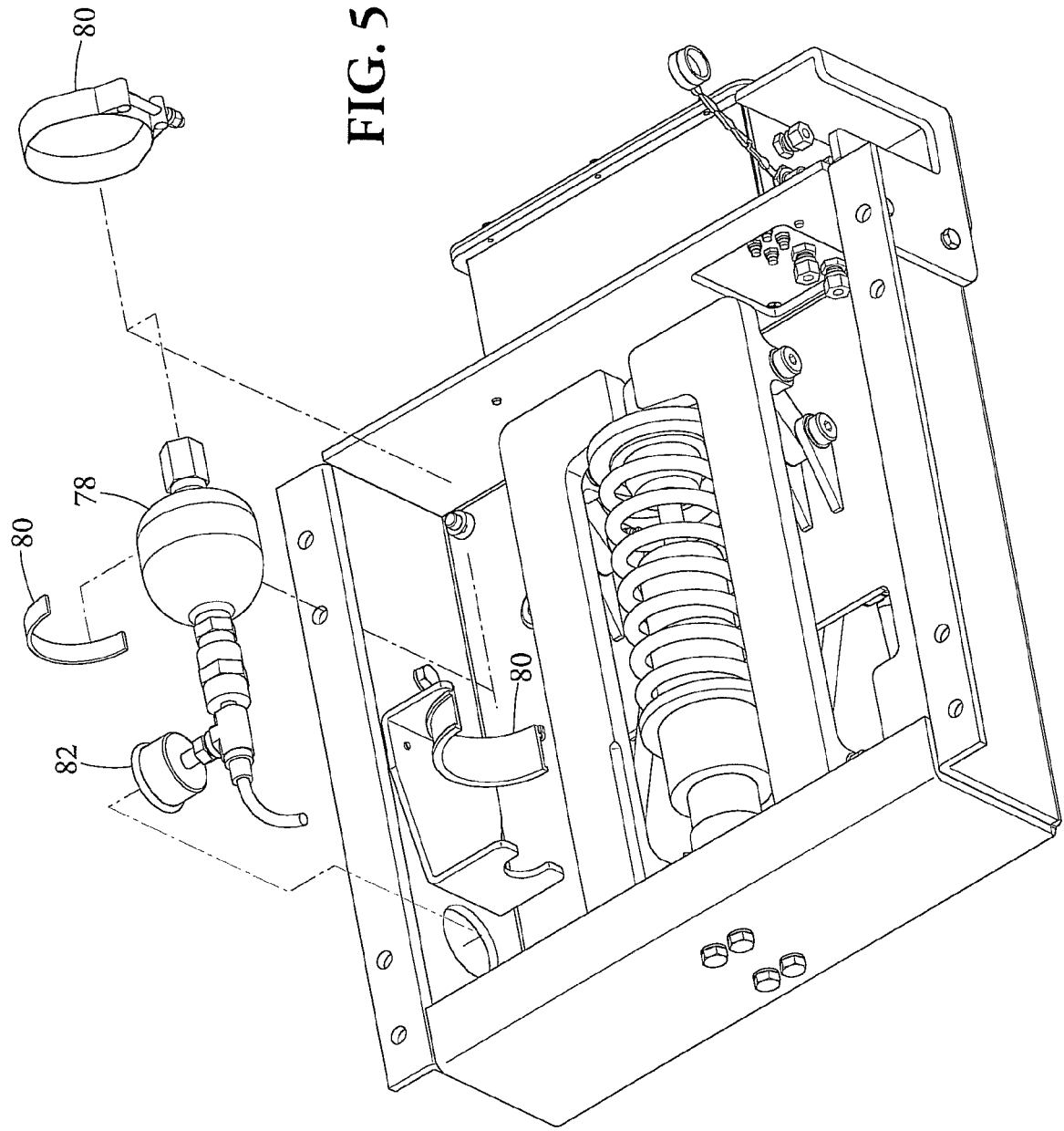
FIG. 5 is a bottom perspective view, partially exploded, illustrating the accumulator associated with the damper element.

With further reference to FIGS. 4 and 5, it may be seen that spring/damper assembly 40 is mounted within base 22, to the top of which is mounted bottom pan 14. Base 22 may be in the general form of a rectangular box with mounting flanges 70 at its lower end to allow it to be mounted to the appropriate support structure, such as a vehicle chassis. The mounting collar 50 of cylinder 46 is mounted to an end wall of the base assembly through spaced mounting flanges 72 on the base wall. The opposite end of the spring/damper assembly 40 mounted through the guide links 60 to sets of mounting flanges 74 on the underside of the top 76 of the base.

The bell crank arms 66 and attached fork links 68 extend upwardly through receiving apertures in the top 76 to connect to the top pan 12 through the pillow blocks 18 mounted to the bottom surface of the top pan. See FIG. 1.

With further reference to FIGS. 4 and 5, spring/damper assembly 40 includes accumulator 78, which is operatively connected to the damper cylinder 46, and is mounted to base 22 by bracket and clamp assembly 80. Accumulator 78 is provided with a gauge 82 by which the pressure in the accumulator may be monitored such that its equilibrium pressure may be adjusted as appropriate to compensate for the tare weight of the apparatus to be supported by the spring/damper assembly.

With reference to FIGS. 3A and 3B, in a static equilibrium position, as depicted in FIG. 3A, the weight of top pan 12 and the object mounted thereon (not shown) rotates bell crank arms 66 generally clockwise, whereby the point of linkage between the bell crank arms and the shock links 42 moves to the left in the Figure. Leftward travel of the shock links in turn moves the piston arm 52 inwardly into the cylinder, until an equilibrium force point is reached. The equilibrium point may be adjusted by varying the accumulator pressure which provides the opposing hydraulic force within the cylinder. Guide links 60 connecting the shock links to the base insure that the motion of the shock links is essentially horizontal, and maintains the spring/damper assembly 40 in an essentially horizontal orientation and within the footprint of the base during operation. When a shock is experienced relative acceleration between the top and bottom pans, driving the pans towards each other, is experienced. This causes the bell crank arms to further rotate clockwise, further attempting to drive the piston into the cylinder, which force is resisted by the hydraulic back pressure and spring 48, whereby damping is accomplished.

As the shock is dissipated, the spring and hydraulic pressure subsequently returns the pan and mounted load to the equilibrium position.

I claim:

1. A shock-mitigating apparatus for mitigating vertical shocks received by a base from being passed to an object supported upon the base, comprising:

a scissors linkage comprising a pair of arms pivotally joined together at an intermediate pivot point, each of the arms having an upper end attached to the object and a lower end attached to the base allowing relative vertical motion between the object and the base;

a damper having a cylinder and a piston oriented horizontally at the base and directly below the scissors linkage, the damper being connected to the base at a first end by a fixed connection and pivotally connected to an articulating arm assembly at a second end for substantially horizontal reciprocating damper action; the articulated arm assembly extending upwardly over the damper and comprising a series arrangement of a shock link, first and second bell crank arms and first and second fork links, the shock link extending horizontally from the second end of the damper to the first end substantially alongside the damper and being connected to the base by a pivoting guide link at the damper second end for horizontal reciprocating movement, the second fork link being connected to the object at a point substantially in vertical alignment with the scissors intermediate pivot point.

2. The apparatus of claim 1, wherein the guide link is connected to the base at a first pivot point and to the damper at a second pivot point.

3. The apparatus of claim 2, wherein the articulated arm assembly is connected to the damper at the guide link second pivot point.

4. The apparatus of claim 2 wherein the articulated arm assembly comprises parallel pairs of a shock link, first and second bell crank arms and first and second fork links.

5. The apparatus of claim 4 wherein the pair of second fork links are pivotally connected to the object, the shock link pair is connected to the damper and the bell crank arms of each pair are joined by the first fork link of the same pair.

6. The apparatus of claim 5 wherein the base is in the form of a box with an upstanding wall supporting the fixed connection with the damper, the damper being positioned within the box.

7. The apparatus of claim 6 wherein the box includes a top wall, the first pivot point for the guide link located at the top wall, and bottom flange means for mounting the box to a supporting surface.

8. The apparatus of claim 4 wherein the damper is located between the parallel pairs.

\* \* \* \* \*